Sept. 13, 1955 C. W. JOHNSTONE 2,717,961
FREQUENCY DIVISION
Filed Jan. 30, 1946
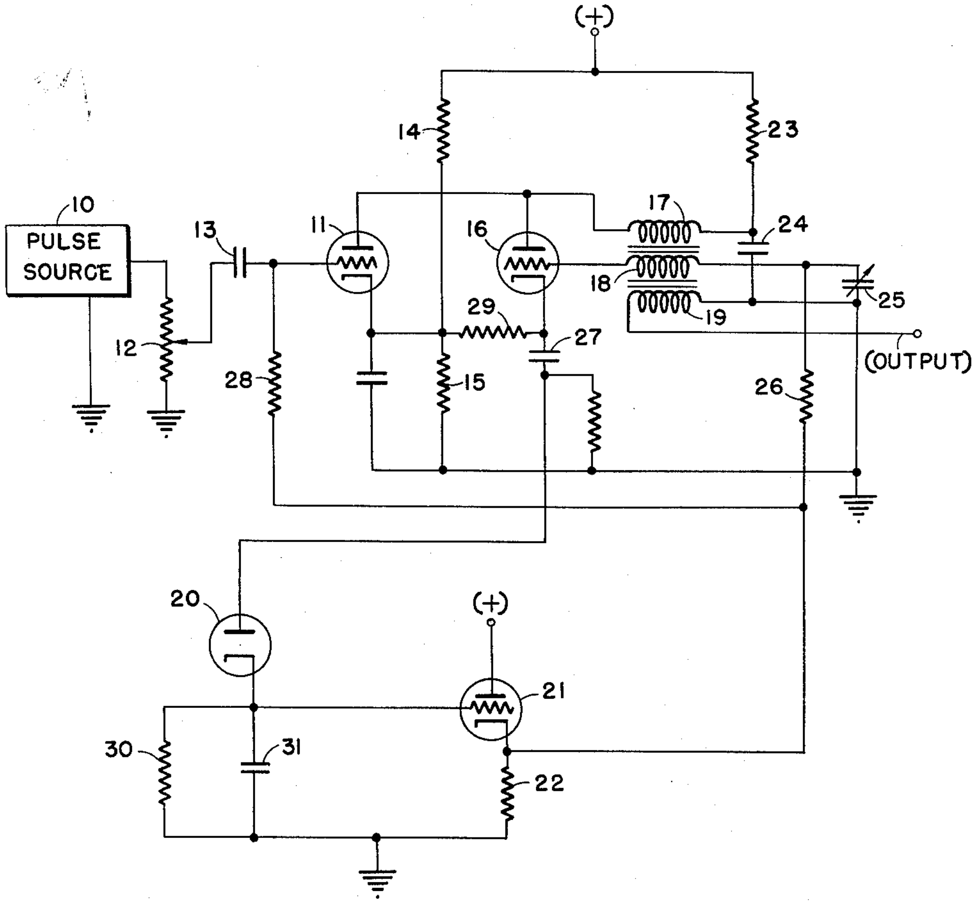
Inventor
CHARLES W. JOHNSTONE
By M. C. Hayes
Attorney 2,717,961

FREQUENCY DIVISION

Charles W. Johnstone, Garden City, N. Y., assignor to the United States of America as represented by the Secretary of the Navy Application January 30, 1946, Serial No. 644,393

4 Claims. (Cl. 250—36)

This invention relates in general to electrical frequency division systems and in particular to count down circuits for producing a series of output pulses at a rate which is a sub-multiple of the recurrence rate of a series of input pulses and in which each of the output pulses occurs in time coincidence with an input pulse.

In numerous applications it is desirable to have a frequency division or count down system capable of responding with a pulse signal output in time coincidence with input pulse signals. Further desirable action is that of frequency division at a constant, selectable ratio until a preselected maximum output frequency is reached under which condition the repetition frequency of the output pulses is no longer permitted to increase but is held constant, with each of the output pulses occurring in time coincidence with an input pulse.

Accordingly, it is an object of the present invention to provide a system for producing frequency division by a known selected ratio.

Another object of the present invention is to provide a frequency division system responsive pulse for pulse when the recurrence frequency of an input pulse signal is below a certain value.

Another object of the present invention is to provide a frequency division system responsive to input pulses for producing output pulse signals in synchronism with input pulses and in which the maximum pulse output frequency is limited to a preselected rate.

Other and further objects and features of the present invention will become apparent upon a careful consideration of the following detailed description when taken together with the accompanying drawing, the single figure of which illustrates a typical embodiment of the invention and the manner in which that embodiment may be considered to operate.

With reference to the figure, a schematic diagram of the frequency division circuit, partly in block, is shown. A series of positive pulse signals of uniform amplitude is obtained from the pulse source 10 which may be of any suitable form known in the art and applied to the grid of a biased electron keying tube 11 through a voltage divider 12 and a coupling capacitance 13. Tube 11 is normally maintained in a cut-off condition by a high positive potential maintained at its cathode from the potential divider consisting of resistances 14, 15 placed between a source of positive potential and ground.

Operably connected to the keying tube 11 is a trigger circuit, preferably of the blocking oscillator type. The trigger circuit as shown consists of an electron tube 16 and a coupling transformer possessing windings 17, 18, 19. In the quiescent condition tube 16 is also maintained in a non-conductive condition due to the positive cathode biasing voltage from the potential divider 14, 15.

Additional biasing voltage, developed in response to an output signal by the unilateral element 20 and the cathode follower amplifier 21 having a load resistance 22, is applied to the control grid of tube 16 through winding 18 of the coupling transformer. Of course, this bias could be applied to one of the other electrodes of tube 16 to satisfactorily perform the same function. For example, this positive biasing voltage could be inverted in polarity and applied to the cathode. Or, it could be stepped up by a value proportional to the mu ($\mu$) of the tube and applied to the plate.

Tube 11 is brought to conduction in response to each pulse of a series of positive input signals, producing a surge of current through winding 17 of the transformer. The surge of current through winding 17 induces a voltage in each winding 18, 19, and by proper selection of the polarity of the windings applies a positive voltage to the grid of tube 16. This positive voltage, if of sufficient amplitude to initiate conduction by tube 16, starts the blocking oscillator action such that the grid of tube 16 is driven further positive. This regenerative action ceases when plate current saturation is reached. When the region of plate current saturation is reached, tube 16 is then rapidly driven beyond cut-off and held there by the negative potential developed across capacitance 25 due to a flow of grid current in tube 16. The negative voltage developed across capacitance 25 is of sufficient amplitude to prevent an immediate triggering of the blocking oscillator by the following input pulse.

The voltage developed across capacitance 25 as a result of grid conduction gradually flows off through resistances 26 and 22 so that after a selected period of time as determined by the time constant of this discharge path, the heavy negative bias maintained upon the grid of tube 16 is reduced sufficiently to permit conduction of tube 16 upon application of a subsequent pulse signal to tube 11. This length of time may be readily adjusted by varying the size of capacitance 25.

An output signal is thus produced across the tertiary winding 19 of the coupling transformer each time the blocking oscillator passes through its conduction cycle.

Frequency division is produced, therefore, by the inability of the circuit to respond to pulse signals occurring during the period of the heavily biased condition of tube 16. The ratio of input pulses to output pulses, also called count down ratio, is readily variable by the aforementioned adjustment of capacitance 25. A further adjustment of this count down ratio is possible by means of voltage divider or potentiometer 12 which selects the percentage of the amplitude of the signal from source 10 which is applied to the grid of tube 11. Such adjustment is possible because the larger amplitude signals applied to tube 11 will cause a heavier pulse current to be drawn by that tube through winding 17 and hence the application of larger positive pulses to the grid of tube 16.

In many applications it is desirable that the frequency dividing action occur at a fixed ratio over a certain input frequency range and, however, limit the output frequency if that range is exceeded, still substantially maintaining time coincidence between each output signal and one of the series of input pulses. To produce this result, an additional biasing voltage is developed by the electron tube components 20 and 21 and accentuated by the special plate voltage adjusting network 23, 24 in the plate circuit of tubes 11 and 16.

As the frequency of the input pulses increases, the duty cycle (percentage of time conducting) of tubes 11 and 16 also increases so that a heavier average current is drawn through resistance 23. This higher average current causes therefore a reduction in the average potential across capacitance 24 so that the blocking oscillator action of tube 16 is less strong, and the grid of tube 16 is not driven to such heavy conduction. Under this condition therefore, the negative voltage developed across capacitance 25 due to the flow of grid current is less so that the period of recovery time after which the blocking oscillator is again susceptible to triggering by pulses from source 10 is reduced. Thus a shorter blocked period of tube 16 results so that automatic action of the circuit is to maintain a constant count down ratio. The aforementioned corrective action cannot increase indefinitely, consequently further increases in the input pulse frequency will not cause a sufficient change in the voltage across capacitance 24 to maintain the selected count down ratio. Under such condition, the circuit will automatically change the count ratio, keeping the output pulse rate at a maximum value, variable again by capacitance 25 and potentiometer 12.

Still further corrective action is achieved as previously mentioned, by the signal developed bias from unilateral element 20 and cathode follower amplifier 21. In the quiescent condition wherein pulse signals are not supplied by source 10, the blocking capacitance 27 prevents conduction by the unilateral element 20. Unilateral element 20 although shown in the drawing as comprising a diode tube could, if desired, take the form of a simple crystal or metallic-oxide rectifier. Thus the grid of tube 21 is maintained at substantially ground potential. A small current flows through tube 21 resulting in the maintenance of the cathode of tube 21 at a low positive voltage. This voltage is applied through the decoupling resistances 26 and 28 to the grids of tubes 16 and 11, respectively, as additional biasing voltage.

Upon the application of pulse signals from source 10 to tube 11, this situation changes. Triggering of the blocking oscillator with attendant heavy surges of current through tube 16 produces positive voltage surges across the resistance 29 in the cathode circuit of tube 16. These positive voltage pulses, coupled to the plate of tube 20 through capacitance 27 result in conduction by tube 20. Thus a pulsating current flow through tube 20 and its cathode resistance 30 takes place which is averaged out by capacitance 31 and applied to the grid of tube 21. The steady voltage on the grid of tube 21 rises resulting in an attendant increase in the positive potential maintained on the grids of tubes 11, 16. Any increase in the average repetition frequency of the pulses from source 10 will thus increase this positive voltage. An increase in the current drawn by tube 11 during each input pulse will result and the period required for the blocking oscillator tube 16 to return to a condition susceptible to triggering after each output pulse will be shortened. This bias adjusting action further amplifies the action of the plate voltage adjusting circuit 23, 24 because it will cause a heavier average current to be drawn by tubes 11, 16 during periods of high input frequency.

In this discussion the corrective operation has been described as taking place in the direction of increasing frequency, actually corrective action in either direction occurs, with a lower limit of a unity ratio of input frequency to output frequency. In this lower limit condition the blocking oscillator tube 16 is triggered by a first pulse and has sufficient time to return to a condition susceptible to triggering before the occurrence of a second pulse.

When the frequency of the input pulses from source 10 is subject to rapid fluctuation, the frequency of the output pulses remains substantially constant, the frequency division ratio absorbing the change. This action is desirable when it is necessary to prevent rapid fluctuation of frequency in any circuit operated from the output signal and is brought about by the time delay inherent in the time constant circuits, particularly the combinations 23, 24; 25, 26, and 30, 31.

Since there is considerable interaction between the various circuits, a change in one circuit affects the operation of the other circuits considerably, the following values of certain circuit elements, and voltages were selected as typical.

| Component: | Size or kind |
|---|---|
| 11 | ½ of 6SN7. |
| 12 | 5000 ohms. |
| 13 | 0.001 mfd. |
| 14 | 56,000 ohms. |
| 15 | 5,600 ohms. |
| 16 | ½ of 6SN7. |
| 17, 18, 19 | Three winding blocking oscillator transformer. |
| 20 | ½ of 6SL7 (grid tied to plate). |
| 21 | ½ of 6SL7. |
| 22 | 2,200 ohms. |
| 23 | 4,700 ohms. |
| 24 | 0.05 mfd. |
| 25 | 0.002–0.004 mfd. |
| 26 | 1 megohm. |
| 27 | 0.001 mfd. |
| 28 | 470,000 ohms. |
| 29 | 15 ohms. |
| 30 | 1 megohm. |
| 31 | 0.05 mfd. |

With a positive pulse signal of 13 volts' amplitude applied to the grid of tube 11, the 0.002 mfd. value of capacitance 25 gave maximum frequency limiting action as previously described in the vicinity of 200 output pulses per second while the 0.004 mfd. value of capacitance 25 gave limiting action in the vicinity of 100 output pulses per second.

From the foregoing discussion it is apparent that considerable modification of the features of this invention are possible, and while the device herein described and the form of apparatus for the operation thereof constitutes a preferred embodiment of the invention it is to be understood that the invention is not limited to this precise device and form of apparatus, and that changes may be made therein without departing from the scope of the invention which is defined in the appended claims.

What is claimed is:

1. An electrical frequency division system providing limitation on the maximum output frequency comprising, a pulse generator circuit including an electron tube having anode, cathode and grid electrodes, means regeneratively coupling the anode and grid circuits of said electron tube to render said tube operative to respond to the application of input pulses to produce output pulses, means within said pulse generator circuit holding said electron tube non-responsive to input pulses for a selected interval of time following each output pulse, a rectifier connected to said pulse generator circuit operative to derive energy pulses of selected polarity each time an output pulse is produced, an integrator circuit deriving a filtered direct current potential from the energy pulses proportional to the output pulse rate up to a limiting maximum potential and not exceeding said potential for higher pulse rates, and means applying said filtered direct current potential to at least one electrode of the electron tube to alter within predetermined limits said selected interval of time in accordance with the input pulse rate.

2. An electrical frequency division system comprising, an electron tube having anode, cathode and grid electrodes, transformer means with primary and secondary windings connected regeneratively in the anode and grid circuits of said electron tube forming a blocking oscillator circuit, input keying means for recurrently supplying input pulses of variable frequency to said electron tube, means including a rectifier coupled to said blocking oscillator for developing a direct current control voltage in proportion to the blocking oscillator frequency, means applying said direct current voltage to the grid electrode of said electron tube to thereby alter the natural output frequency of the blocking oscillator circuit, and means for deriving an output signal each time the blocking oscillator experiences a cycle of operation.

3. An electrical frequency division system providing limitation on the maximum output frequency comprising, an electron tube with at least anode, cathode and control grid electrodes, a transformer regeneratively coupling the grid and anode circuits, a grid leak bias circuit connected to the grid of said electron tube for holding said tube non-conductive for a period of time following each occurrence of grid current flow during regenerative action, input keying means for supplying variable frequency keying signals to the electron tube to initiate regenerative action, and bias adjusting means connected to the grid leak bias circuit for supplying a direct current potential to the grid electrode of the electron tube, said direct current potential characterized by being variable in proportion to the regeneration recurrence frequency and having a selected maximum value.

4. An electrical frequency division system providing limitation on the maximum output frequency comprising, an electron tube with at least anode, cathode and control grid electrodes, a source of anode circuit direct current voltage, a transformer regeneratively coupling the grid and anode circuits of said electron tube, a grid leak bias circuit connected to the grid of said electron tube for holding said tube non-conductive for a period of time following each occurrence of grid current flow during regenerative action, input keying means for supplying variable frequency keying signals to the electron tube to initiate regenerative action, bias adjusting means connected to the grid leak bias circuit for supplying a direct current potential to the grid electrode of the electron tube, said direct current potential characterized by being variable in proportion to the regeneration recurrence frequency and having a selected maximum value, and a time constant circuit connected in the anode circuit of said electron tube operative to vary the direct current voltage applied thereto in an inverse sense proportional to the regeneration recurrence frequency.

References Cited in the file of this patent

UNITED STATES PATENTS

| | | |
|---|---|---|
| 2,171,536 | Bingley | Sept. 5, 1939 |
| 2,212,202 | Faudell et al. | Aug. 20, 1940 |
| 2,250,706 | Geiger | July 29, 1941 |
| 2,292,835 | Hepp | Aug. 11, 1942 |
| 2,308,908 | Bahring | Jan. 19, 1943 |